(12) United States Patent
Obana et al.

(10) Patent No.: US 12,427,402 B2
(45) Date of Patent: Sep. 30, 2025

(54) OPERATION SYSTEM, INFORMATION PROCESSING SYSTEM, OPERATION INFORMATION GENERATION METHOD, AND OPERATION INFORMATION GENERATION PROGRAM

(71) Applicant: Sony Interactive Entertainment Inc., Tokyo (JP)

(72) Inventors: Koichi Obana, Tokyo (JP); Kazuyuki Shikama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 464 days.

(21) Appl. No.: 17/998,102

(22) PCT Filed: May 22, 2020

(86) PCT No.: PCT/JP2020/020337
§ 371 (c)(1),
(2) Date: Nov. 7, 2022

(87) PCT Pub. No.: WO2021/234951
PCT Pub. Date: Nov. 25, 2021

(65) Prior Publication Data
US 2023/0166179 A1 Jun. 1, 2023

(51) Int. Cl.
*A63F 13/2145* (2014.01)
*A63F 13/211* (2014.01)
*A63F 13/23* (2014.01)

(52) U.S. Cl.
CPC ........ *A63F 13/2145* (2014.09); *A63F 13/211* (2014.09); *A63F 13/23* (2014.09); *A63F 2300/1025* (2013.01); *A63F 2300/1075* (2013.01)

(58) Field of Classification Search
CPC .......... A63F 13/22; A63F 13/23; A63F 13/24; A63F 13/2145
See application file for complete search history.

(56) References Cited

U.S. PATENT DOCUMENTS 7,733,637 B1 * 6/2010 Lam .................. G06F 3/0202
361/679.08
9,764,231 B2 * 9/2017 Townley ................ A63F 13/23
(Continued)

FOREIGN PATENT DOCUMENTS

JP 2012249644 A 12/2012

OTHER PUBLICATIONS

Notice of Reasons for Refusal for corresponding JP Application No. 2022524839, 12 pages, dated Apr. 22, 2024.
(Continued)

*Primary Examiner* — James S. McClellan
(74) *Attorney, Agent, or Firm* — Kilpatrick Townsend & Stockton LLP

(57) ABSTRACT

An operation system includes an operation device and an information terminal connected to the operation device. The operation device has an operation section including a plurality of operating elements. The information terminal includes an operation registration section configured to register an operation involving use of at least one of the plurality of operating elements to a target operating element constituted by at least one of the plurality of operating elements, an operation determination section configured to determine whether or not the target operating element is operated, and an information generation section configured to generate, when the target operating element is determined to be operated, operation information corresponding to the operation registered to the target operating element by the operation registration section. Either the operation device or the information terminal includes an information transmission section configured to transmit the operation information generated by the information generation section.

9 Claims, 12 Drawing Sheets

(56) References Cited

U.S. PATENT DOCUMENTS

| | | | | |
|---|---|---|---|---|
| 2006/0252537 A1* | 11/2006 | Wu | ........................ | A63F 13/92 463/36 |
| 2009/0131171 A1 | 5/2009 | Miyazaki | | |
| 2010/0250815 A1* | 9/2010 | Street | ..................... | G06F 1/1626 710/303 |
| 2013/0106687 A1 | 5/2013 | Baum | | |
| 2013/0267322 A1* | 10/2013 | South | ..................... | A63F 13/24 463/37 |
| 2013/0311948 A1* | 11/2013 | McCoy | ................... | G06F 3/017 715/825 |
| 2015/0031452 A1* | 1/2015 | Rundell | ................... | A63F 13/23 463/31 |
| 2016/0147359 A1* | 5/2016 | Helmes | ................... | A63F 13/24 345/173 |
| 2016/0231773 A1* | 8/2016 | Inoue | ..................... | G06F 1/1686 |
| 2017/0056762 A1* | 3/2017 | Gafni | ..................... | A63F 13/235 |
| 2021/0362046 A1* | 11/2021 | Farrell, Jr. | ............ | A63F 13/327 |

OTHER PUBLICATIONS

Author unknown, "With a macro function, the combo input is executed by a single button." Full-specifications loading, analog-to-digital correspondence 12 button USB game pad Sale, The Wayback Machine, https://web.archive.org/web/20090524142055/http:www.elecom.co.jp/news/200905/jc-u2812f/, 3 pages, dated May 19, 2009.

International Search Report for corresponding PCT Application No. PCT/JP2020/020337, 5 pages, dated Jul. 21, 2020.

Smartasw "How to Connect a Controller" ("Octopus"—The App That Lets You Operate Non-Gamepad-Compatible Apps with a Game pad or with Mouse and Keyboard.) https://smartasw.com/archives/%E3%80%8Coctopus%E3%80%BD%EF%BC%9A%E3%82%B2%E3%83%BC%E3%83%A0%E3%83%91%E3%83%83%E3%83%89%E9%9D%9E%E5%AF%BE%E5%BF%9C%E3%81%AE%E3%82%A2%E3%83%97%E3%83%AA%E3%82%B2%E3%82%B2%E3%83%BC%BC%E3%83%A0%E3%83%91.html> 35 pages, Mar. 12, 2020.

PlayStation Blog, "DualShock 4, Apple IPhone IPad PS4", URL:https://blog.ja.playstation.com/20019/10/01/20191001-remoteplay/> 4 pages, Oct. 1, 2019.

[TIPs] Button Alias #1: Assign more shortcuts beyond the number of buttons[online]May 19, 2019.

It is with a macro function—itis execution with one button about a combo input! It and there is. [full-specifications-] [ the 12 button USB gamepad corresponding to analog-to-digitalone ] Internet:<URL:https: [the sale, [online], May 24, 2009.

* cited by examiner

OPERATION SYSTEM, INFORMATION PROCESSING SYSTEM, OPERATION INFORMATION GENERATION METHOD, AND OPERATION INFORMATION GENERATION PROGRAM

TECHNICAL FIELD

The present disclosure relates to an operation system, an information processing system, an operation information generation method, and an operation information generation program.

BACKGROUND ART

There are known to exist operation devices each connected to an information processing device such as a PC (Personal Computer) or a game machine so as to transmit operation signals to the information processing device (e.g., see PTL 1).

A controller (i.e., operation device) described in PTL 1 has a right-side grip and a left-side grip to be held by the right and left hands of a user, with arrow buttons and operation buttons disposed at the front face of the controller.

CITATION LIST

Patent Literature

[PTL 1] US 2009/0131171A

SUMMARY

Technical Problem

The operation device described in PTL 1 has each of its buttons assigned an operation signal to be transmitted to the information processing device. The operation device thus transmits the operation signals corresponding to the input buttons. That means that only the preset operation signals can be transmitted, which poses the problem of low versatility of the device.

The present disclosure is intended to solve at least part of the above-described problem. An object of the disclosure is therefore to provide an operation system, an information processing system, an operation information generation method, and an operation information generation program that are highly versatile.

Solution to Problem

According to a first embodiment of the present disclosure, there is provided an operation device, and an information terminal connected to the operation device, in which the operation device has an operation section including a plurality of operating elements, the information terminal includes an operation registration section configured to register an operation involving use of at least one of the plurality of operating elements to a target operating element constituted by at least one of the plurality of operating elements, an operation determination section configured to determine whether or not the target operating element is operated, and an information generation section configured to generate, when the target operating element is determined to be operated, operation information corresponding to the operation registered to the target operating element by the operation registration section, and either the operation device or the information terminal includes an information transmission section configured to transmit the operation information generated by the information generation section.

According to a second embodiment of the present disclosure, there is provided an operation system including an operation device, and an information terminal connected to the operation device, in which the operation device has an operation section including a plurality of operating elements, the information terminal includes a touch panel, a button setting section configured to set a virtual button to the touch panel, a function registration section configured to register the virtual button in association with a predetermined function, and an information generation section configured to generate, when the virtual button is operated, operation information corresponding to the function registered by the function registration section, and either the operation device or the information terminal includes an information transmission section configured to transmit the operation information generated by the information generation section.

According to a third embodiment of the present disclosure, there is provided an information processing system including the above-described operation system and an information processing device configured to operate on the basis of the operation information received from the operation system, in which the information terminal includes a display section, a communication section configured to communicate with the information processing device, and a display control section configured to cause the display section to display an image received by the communication section from the information processing device.

According to a fourth embodiment of the present disclosure, there is provided an operation information generation method for execution by an information terminal connected to an operation device having a plurality of operating elements, the operation information generation method including an operation registration procedure of registering an operation involving use of at least one of the plurality of operating elements to a target operating element constituted by at least one of the plurality of operating elements, an operation determination procedure of determining whether or not the target operating element is operated, and an information generation procedure of generating, when the target operating element is determined to be operated, operation information corresponding to the operation registered to the target operating element.

According to a fifth embodiment of the present disclosure, there is provided an operation information generation method for execution by an information terminal connected to an operation device having a plurality of operating elements, the operation information generation method including a button setting procedure of setting a virtual button to a touch panel included in the information terminal, a function registration procedure of registering the virtual button in association with a predetermined function, and an information generation procedure of generating, when the virtual button is operated, operation information corresponding to the function registered by the function registration procedure.

According to a sixth embodiment of the present disclosure, there is provided an operation information generation program for execution by an information terminal connected to an operation device having a plurality of operating elements, the operation information generation program causing the information terminal to execute an operation registration step of registering an operation involving use of at least one of the plurality of operating elements to a target operating element constituted by at least one of the plurality of operating elements, an operation determination step of determining whether or not the target operating element is operated, and an information generation step of generating, when the target operating element is determined to be operated, operation information corresponding to the operation registered to the target operating element.

According to a seventh embodiment of the present disclosure, there is provided an operation information generation program for execution by an information terminal connected to an operation device having a plurality of operating elements, the operation information generation program causing the information terminal to execute a button setting step of setting a virtual button to a touch panel included in the information terminal, a function registration step of registering the virtual button in association with a predetermined function, and an information generation step of generating, when the virtual button is operated, operation information corresponding to the function registered by the function registration step.

DESCRIPTION OF EMBODIMENTS

First Embodiment

A first embodiment of the present disclosure is described below with reference to the accompanying drawings.
[Schematic Configuration of Information Processing System]

Figure 1:
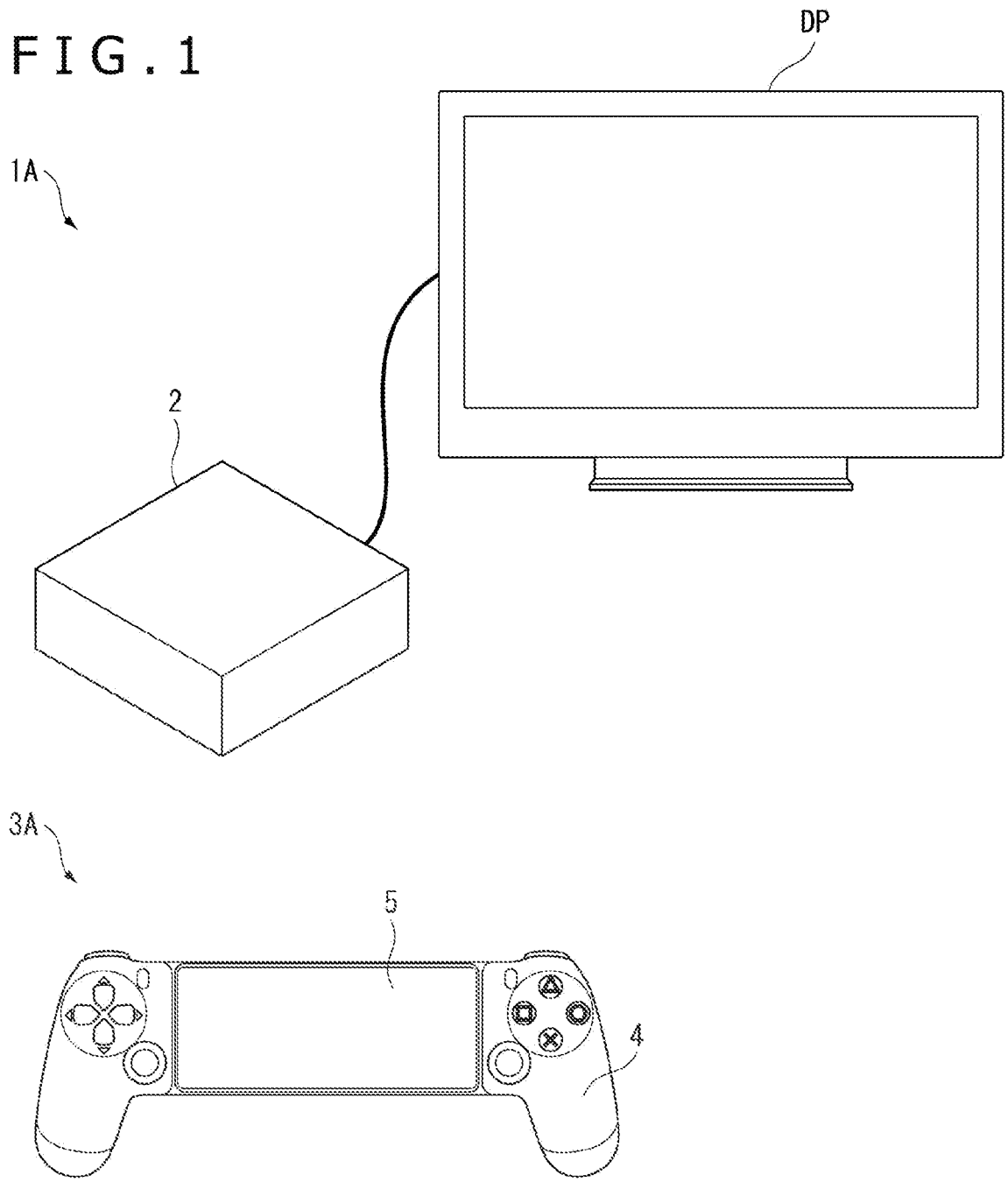
FIG. 1 is a schematic diagram depicting an information processing system according to a first embodiment of the present disclosure.

FIG. 1 is a schematic diagram depicting a configuration of an information processing system 1A related to the first embodiment.

As depicted in FIG. 1, the information processing system 1A according to the first embodiment includes an information processing device 2 and an operation system 3A. In the information processing system 1A, the operation system 3A transmits operation information corresponding to the operation performed by the user. The information processing device 2 performs processes corresponding to the operation information received from the operation system 3A.

Each of the constituent elements of the information processing system 1A is explained below.
[Configuration of Information Processing Device]

Figure 2:
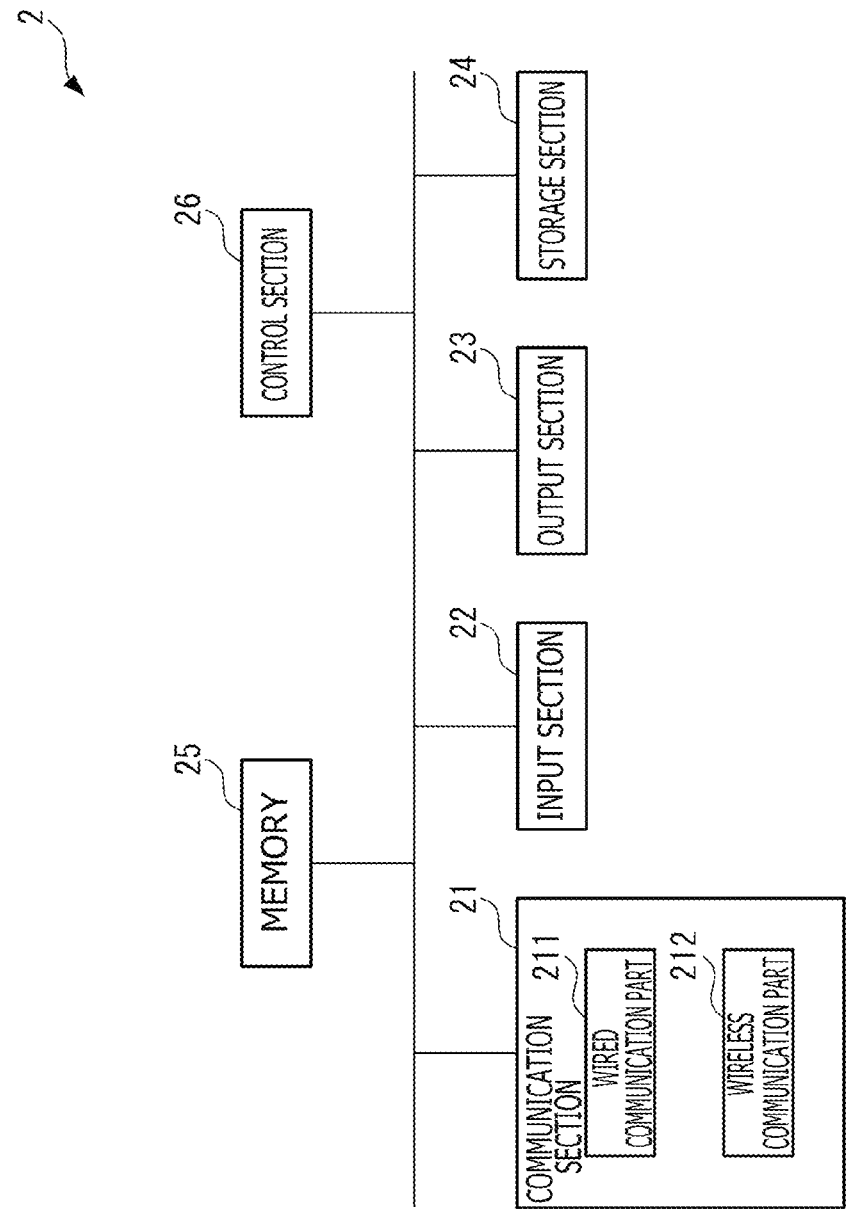
FIG. 2 is a block diagram depicting a configuration of an information processing device according to the first embodiment.

FIG. 2 is a block diagram depicting a configuration of the information processing device 2. The information processing device 2 is a computer capable of executing predetermined processes. For example, the information processing device 2 may be a game machine capable of executing game programs. As depicted in FIG. 2, the information processing device 2 includes a communication section 21, an input section 22, an output section 23, a storage section 24, a memory 25, and a control section 26.

The communication section 21 communicates with external equipment under control of the control section 26. The communication section 21 includes a wired communication part 211 and a wireless communication part 212. The wired communication part 211 is configured to be connectable with a communication cable such as a LAN (Local Area Network) cable, and communicates with the external equipment in a wired manner. The wireless communication part 212 communicates wirelessly with the external equipment by a communication system based on a near-field wireless communication protocol such as Bluetooth (registered trademark), for example. In the first embodiment, the wireless communication part 212 communicates with the operation system 3A and outputs the operation information received from the operation system 3A to the control section 26.

The input section 22 is configured to be connectable with a cable such as a USB (Universal Serial Bus) cable. The input section 22 outputs signals input through the cable to the control section 26. The output section 23 outputs the signals input from the control section 26 to the external equipment. For example, the output section 23 is configured to be connectable with a cable such as an HDMI (registered trademark) cable. The output section 23 outputs video signals input from the control section 26 to a display device DP via the cable.

The storage section 24 is a storage device such as an HDD (Hard Disk Drive) or an SSD (Solid State Drive) that stores the programs and data necessary for the information processing device 2 to operate. In the first embodiment, the storage section 24 stores an OS (Operating System) for controlling the information processing device 2, as well as game programs. The storage section 24 also stores information regarding connection with the external equipment with which the communication section 21 communicates. The memory 25 is a work memory for the control section 26. The memory 25 temporarily holds the programs and data stored in the storage section 24.

The control section 26 includes operation processing circuits such as a CPU (Central Processing Unit) and a GPU (Graphics Processing Unit). By executing the OS held in the storage section 24, the control section 26 controls the operation of the information processing device 2. The control section 26 executes a game program stored in the storage section 24 in order to advance the game. At this point, the control section 26 enables the ongoing game to progress in a manner reflecting the operation information received from the operation system 3A. The control section 26 also generates execution screens of the currently executing application. For example, in a case where the control section 26 is executing a game program, the control section 26 generates a main screen and a sub-screen of the ongoing game. The control section 26 outputs the generated main screen to the display device DS via the output section 23 while transmitting the generated sub-screen to the operation system 3A via the communication section 21.

[Configuration of Operation System]

Figure 3:
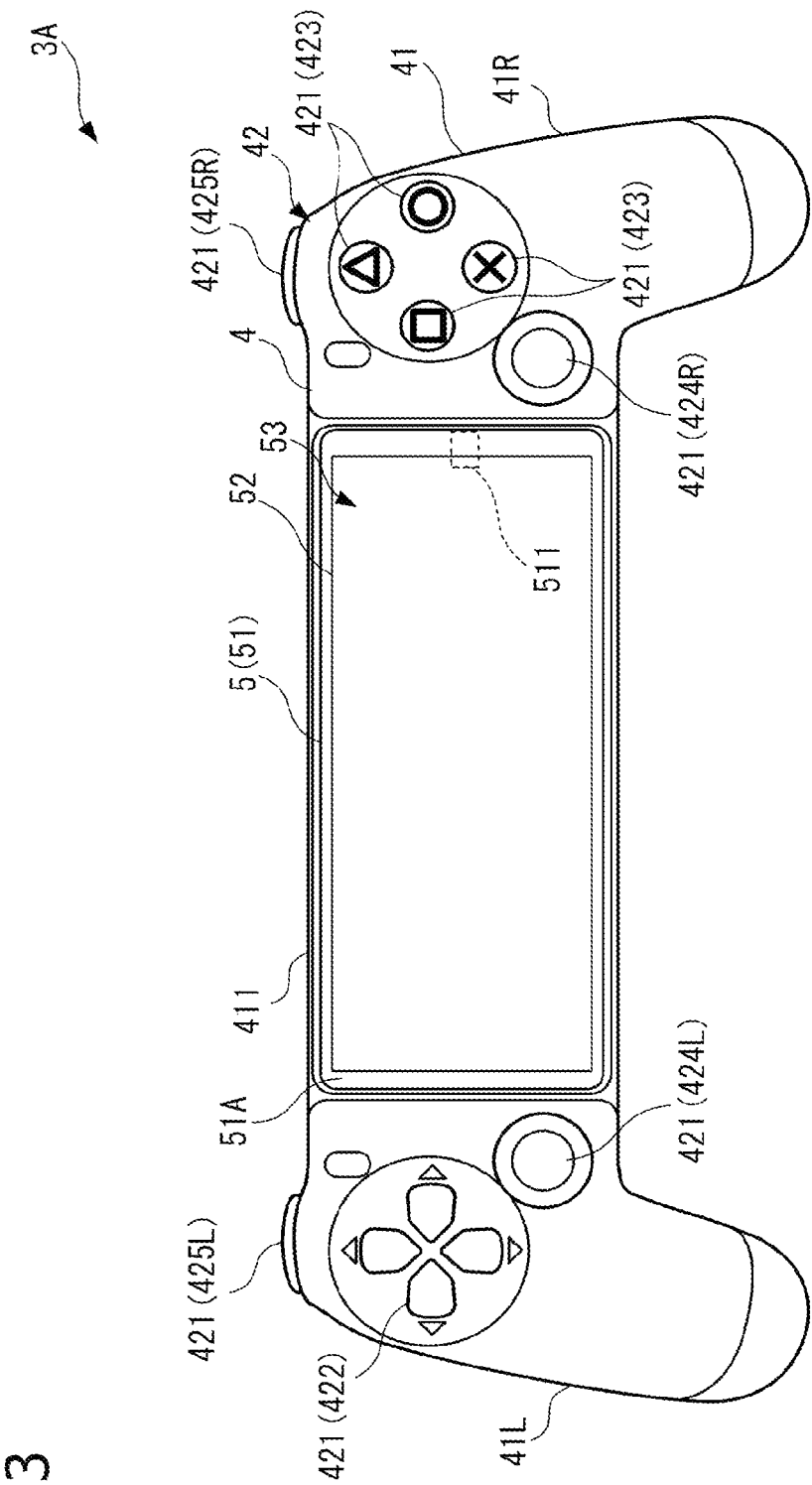
FIG. 3 is a front view depicting an operation system according to the first embodiment.

FIG. 3 is a front view depicting the operation system 3A. The operation system 3A transmits to the information processing device 2 the operation information corresponding to the operation performed by the user. The operation system 3A has an operation device 4 and an information terminal 5 which are configured to operate in coordination with each other.

[Configuration of Operation Device]

The operation device 4, formed integrally with the information terminal 5, outputs the operation signal corresponding to the operation performed by the user to the information terminal 5. The operation device 4 includes a housing 41 and an operation section 42 disposed in the housing 41.

[Configuration of Housing]

The housing 41 constitutes a sheathing of the operation device 4. The housing 41 includes a central part 411, a left-side grip 41L provided on the left of the central part 411, and a right-side grip 41R disposed on the right of the central part 411. The central part 411 is a substantially rectangular part to which the information terminal 5 is attached. That is, the information terminal 5 is attached to the housing 41. Although not depicted, the central part 411 has a terminal part to be inserted into the information terminal 5. The left-side grip 41L is a part to be held by the left hand of the user. The right-side grip 41R is a part to be held by the right hand of the user. The left-side grip 41L and the right-side grip 41R are formed integrally with the central part 411.

[Configuration of Operation Section]

The operation section 42 accepts the operations of the user. Specifically, the operation section 42 has multiple operating elements that are operated by the user. When operated by the user, each of the operating elements 421 outputs an operation signal that includes at least either an identification signal identifying the operating element 421 being operated or a content signal indicative of the content of the operation performed by the user on the operating element 421. The multiple operating elements 421 include arrow buttons 422, four buttons 423, two analog controllers 424L and 424R, and two trigger buttons 425L and 425R.

The arrow buttons 422 are buttons that can be pressed for the up, down, left, and right directions. These buttons are disposed on the left-side grip 41L. When operated by the user, the arrow buttons 422 each output an operation signal that includes an identification signal identifying the operated arrow button 422 and a content signal indicative of the input direction.

The four buttons 423 are disposed on the right-side grip 41R in a manner individually depressible and projectable. When pressed by the user, each of the four buttons 423 outputs an operation signal including an identification signal identifying the pressed button 422. Note that, because each of the four buttons 423 outputs the operation signal every time it is pressed, the pressed button 423 can be recognized from the operation signal even though the operation signal does not include the content signal indicative of the content of the operation.

The analog controller 424L is disposed on the left-side grip 41L, and the analog controller 424R is provided on the right-side grip 41R. Although not depicted in detail, the analog controllers 424L and 424R have each a shaft part that is tiltable by the user, and detect the direction and amount of tilt of the shaft part. Upon detecting a tilt of the shaft part, the analog controller 424L outputs an operation signal that includes an identification signal identifying the analog controller 424L and a content signal indicative of the detected direction and amount of tilt of the shaft part. The same also applies to the analog controller 424R.

The trigger button 425L is a button disposed on the left-side grip 41L in a depressible and projectable manner. The trigger button 425R is a button provided on the right-side grip 41R also in a depressible and projectable manner. When pressed by the user, the trigger button 425L outputs an operation signal including identification information identifying the trigger button 425L. The same also applies to the trigger button 425R. Note that, because each of the trigger buttons 425L and 425R outputs the operation signal every time it is pressed, the operation of the pressed trigger button 425L or 425R can be recognized from the operation signal even though the output operation signal does not include the content signal indicative of the content of the operation.

[Configuration of Information Terminal]

As depicted in FIG. 3, the information terminal 5 is attached to the central part 411 of the operation device 4 in a manner being connected with the terminal part disposed in the central part 411. That is, the information terminal 5 is connected to the operation device 4 in a wired manner. For example, the information terminal 5 can include a smartphone, which is a multifunctional mobile phone, or a tablet.

The information terminal 5 includes a housing 51, a display section 52, and a touch panel 53. The housing 51 constitutes a sheathing of the information terminal 5. The side surface of the housing 51 is furnished with a terminal part 511 into which the terminal part disposed in the central part of the operation device 4 is inserted. The terminal part 511 can be a USB terminal, for example. The display section 52 is disposed at a front face 51A of the housing 51. The display section 52 displays an image corresponding to the video signal input from a control section 6, to be discussed later. The display section 52 can display a variety of display panels such as a liquid crystal panel and an organic EL (Electro-Luminescence) panel. The touch panel 53 is disposed to overlap with the display section 52. The touch panel 53 detects the position on which the user has operated, and outputs coordinates indicative of the detected operating position to the control section 6.

Figure 4:
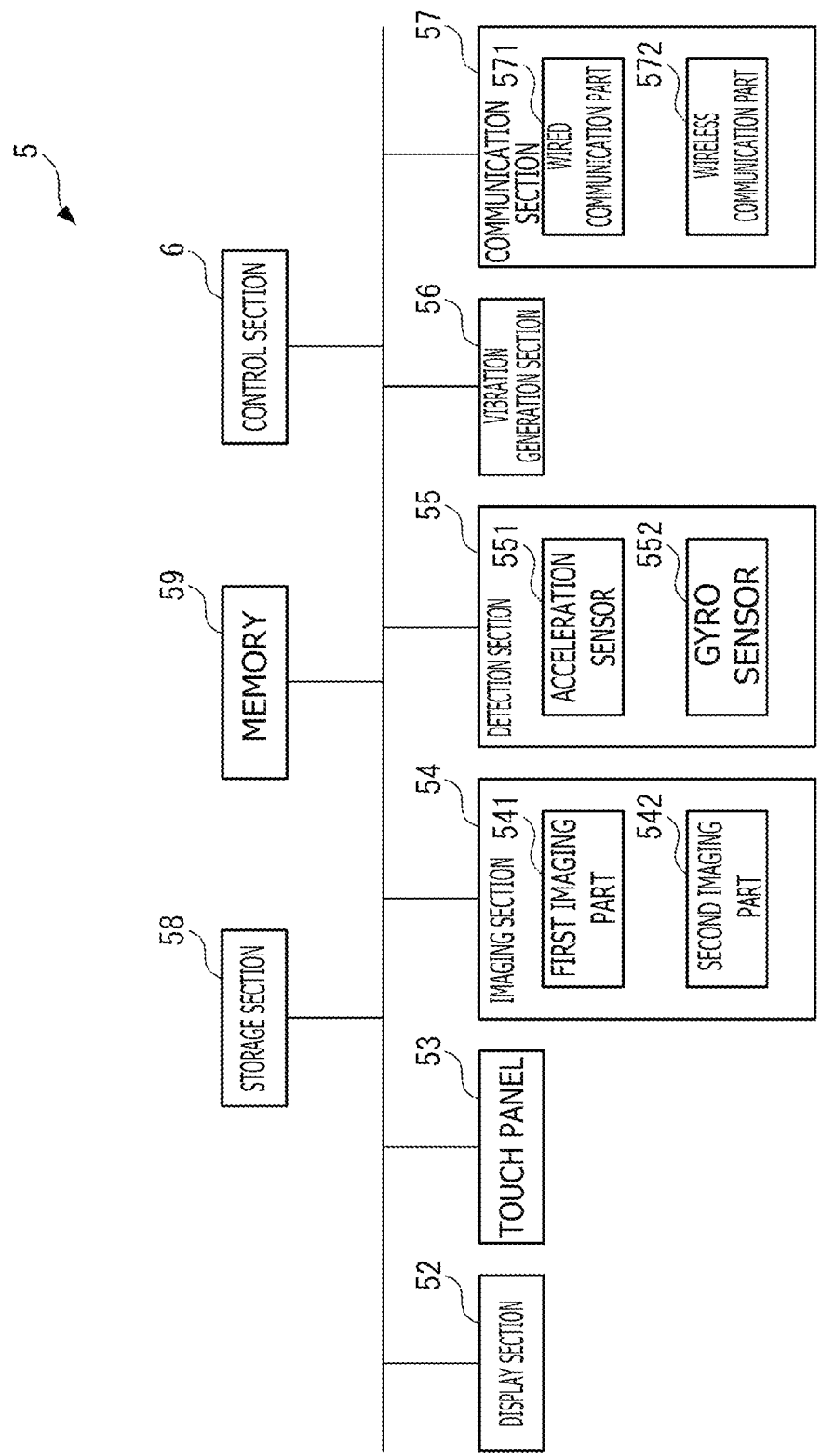
FIG. 4 is a block diagram depicting a configuration of an information terminal according to the first embodiment.

FIG. 4 is a block diagram depicting a configuration of the information terminal 5. As depicted in FIG. 4, the information terminal 5 includes an imaging section 54, a detection section 55, a vibration generation section 56, a communication section 57, a storage section 58, a memory 59, and a control section 6 in addition to the above-described constituent elements. The imaging section 54 captures an image of a predetermined imaging range, and outputs the captured image to the control section 6. The imaging section 54 includes a first imaging part 541 disposed at the front face 51A, and a second imaging part 542 provided on the opposite back side of the front face 51A on the housing 51. Alternatively, the imaging section 54 may have either the first imaging part 541 or the second imaging part 542 alone. As another alternative, the imaging section 54 may be omitted.

The detection section 55 detects the motion of the information terminal 5, i.e., the motion of the operation system 3A. Specifically, the detection section 55 detects the acceleration and angular velocity affecting the information terminal 5, i.e., the acceleration and angular velocity affecting the operation system 3A. The detection section 55 includes a three-axis acceleration sensor 551 for detecting acceleration and a gyro sensor 552 for detecting angular velocity. Alternatively, the detection section 55 may have either the acceleration sensor 551 or the gyro sensor 552 only. The acceleration sensor 551 may be replaced by a gravity sensor. As a further alternative, the detection section 55 may be omitted.

The vibration generation section 56 generates vibration under control of the control section 6. Specifically, the vibration generation section 56 generates vibration by being driven in response to a drive signal input from the control section 6. Alternatively, the vibration generation section 56 may be omitted. The operation device 4 may alternatively be equipped with the vibration generation section 56.

The communication section 57 communicates with external equipment under control of the control section 6. The communication 57 includes a wired communication part 571 and a wireless communication part 572. Under control of the control section 6, the wired communication part 571 communicates with the external equipment connected via the terminal part 511. For example, the wired communication part 571 communicates with the operation device 4 via the terminal part 511. The wired communication part 571 then outputs the operation signal input from the operation device 4 to the control section 6. Also, under control of the control section 6, the wired communication part 571 outputs a control signal for controlling the operation of the operation device 4, for example. As with the wireless communication part 212, the wireless communication part 572 communicates wirelessly with the external equipment by a communication system based on a near-field wireless communication protocol such as Bluetooth (registered trademark). For example, the wireless communication part 572 communicates with the information processing device 2 and transmits the operation information generated by the control section 6 to the information processing device 2. Also, the wireless communication part 572 outputs the image received from the information processing device 2 to the control section 6.

The storage section 58 stores the programs and data necessary for the information terminal 5 to operate. For example, the storage section 58 stores the OS for controlling the information terminal 5. Also, the storage section 58 stores operation applications for operating in coordination with the operation device 4, for example. The operation applications include programs for executing a virtual button-related process and an assigned operation-related process, to be discussed later. The memory 59 is a work memory for the control section 6.

[Configuration of Control Section]

Figure 5:
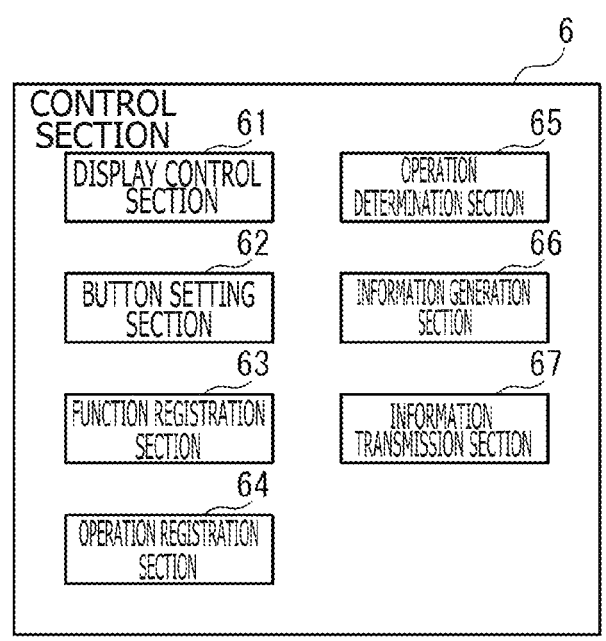
FIG. 5 is a functional block diagram depicting a configuration of a control section according to the first embodiment.

FIG. 5 is a functional block diagram depicting a configuration of the control section 6. As with the control section 26 in the information processing device 2, the control section 6 includes operation processing circuits such as the CPU and GPU. By executing the OS held in the storage section 58, the control section 6 controls the operation of the information terminal 5. By carrying out the operation applications stored in the storage section 58, the control section 6 generates the operation information corresponding to the operations performed by the user on the operation device 4, and outputs the generated operation information to the information processing device 2. The control section 6 includes a display control section 61, a button setting section 62, a function registration section 63, an operation registration section 64, an operation determination section 65, an information generation section 66, and an information transmission section 67. The button setting section 62, the function registration section 63, the operation registration section 64, the operation determination section 65, the information generation section 66, and the information transmission section 67 are caused to function by the control section 6 executing the operation applications with the information terminal 5 attached to the operation device 4.

[Configuration of Display Control Section]

The display control section 61 controls the display section 52. In other words, the display control section 61 generates the image to be displayed on the display section 52, and outputs the generated image to the display section 52 for display thereon. Also, the display control section 61 causes the display section 52 to display the sub-screen image received by the communication section 57 from the information processing device 2. This makes it possible to use the display section 52 as a second screen for the information processing system 1A. Another image to be displayed on the display section 52 by the display control section 61 is a setting screen for the operation system 3A, for example.

[Configuration of Button Setting Section]

Figure 6:
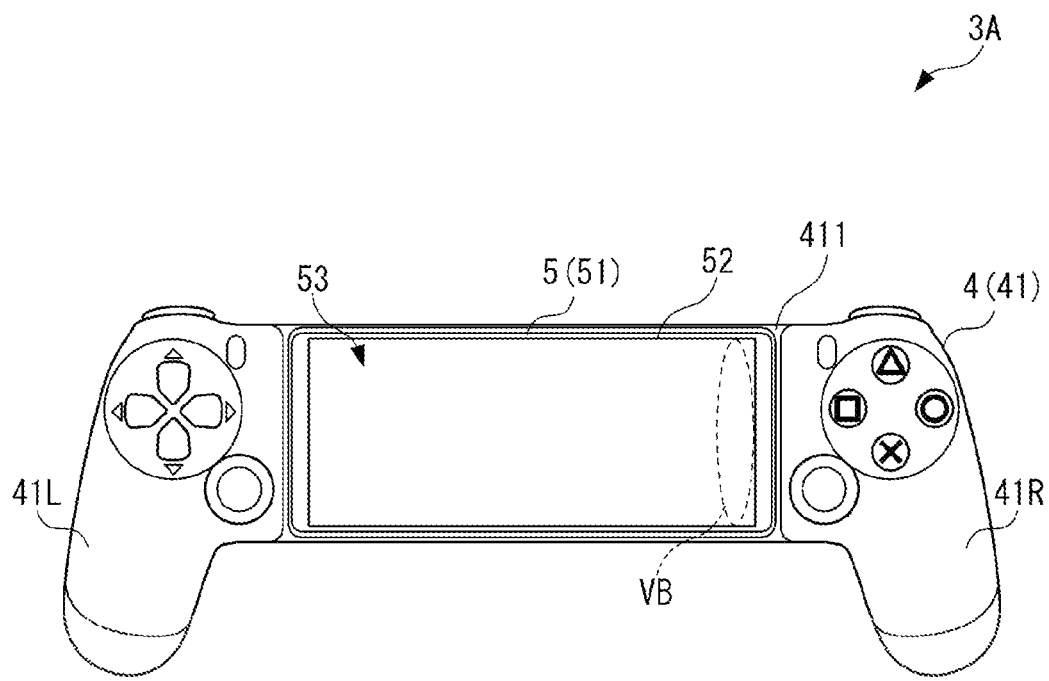
FIG. 6 is a schematic diagram depicting an exemplary virtual button set on a touch panel according to the first embodiment.

FIG. 6 is a schematic diagram depicting an exemplary virtual button VB set on the touch panel 53. The button setting section 62 sets on the touch panel 53 a region caused to function as a virtual button. Specifically, upon execution of an operation application by the control section 6, with the user performing operations to set a virtual button, the button setting section 62 causes the virtual button VB to be set in that region of the touch panel 53 which is desired by the user, as depicted in FIG. 6 as an example. More specifically, the button setting section 62 causes the storage section 58 to store the coordinates designating the range of the virtual button VB set by the user on the touch panel 53. The virtual button VB set in this manner is a software button that can be operated during execution of the operation application. The set range of the virtual button VB may be displayed to overlap with the sub-screen by the display control section 61. Note that the virtual button VB is not limited to one and can be set to be plural numbers as well.

[Configuration of Function Registration Section]

The function registration section 63 indicated in FIG. 5 registers the function desired by the user to the virtual button VB set by the button setting section 62. For example, the function registration section 63 registers, in association with the virtual button VB, an operation involving the use of at least one of the multiple operating elements 421 constituting the operation section 42. Specifically, the function registration section 63 registers, in association with the virtual button VB, a command expressed by operating at least one operating element 421 simultaneously or continuously. With the registration thus made, in a case where the information processing device 2 is executing a fighting game, for example, inputting the virtual button VB causes the information transmission section 67, which will be discussed later, to transmit a complex command representing a predetermined special attack to the information processing device 2. Incidentally, the function to be registered by the function registration section 63 in association with the virtual button VB is not limited to the operations involving the use of at least one of the multiple operating elements 421. The registered function may alternatively be one which causes the information processing device 2 to carry out any of the functions it possesses.

[Configuration of Operation Registration Section]

Figure 7:
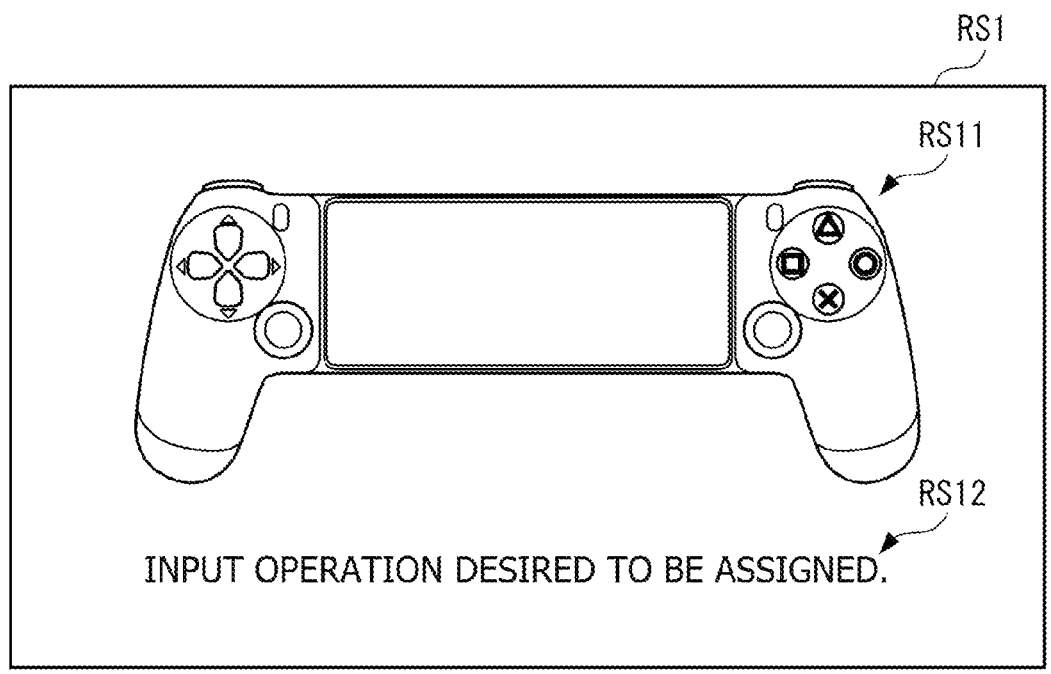
FIG. 7 is a schematic diagram depicting an exemplary operation registration screen according to the first embodiment.

FIG. 7 is a schematic diagram depicting an exemplary operation registration screen RS1. The operation registration section 64 registers the operation desired by the user to at least one of the multiple operating elements 421. For example, during execution of an operation application by the control section 6, the user may carry out operations to execute an assigned operation registration process, to be discussed later. At this point, the display control section 61 causes the display section 52 to display the operation registration screen RS1. The operation registration screen RS1 includes, as depicted in FIG. 7, for example, a display region RS11 displaying a pattern imitating the operation system 3A, and a message RS12 indicative of the content of the operation.

Figure 8:
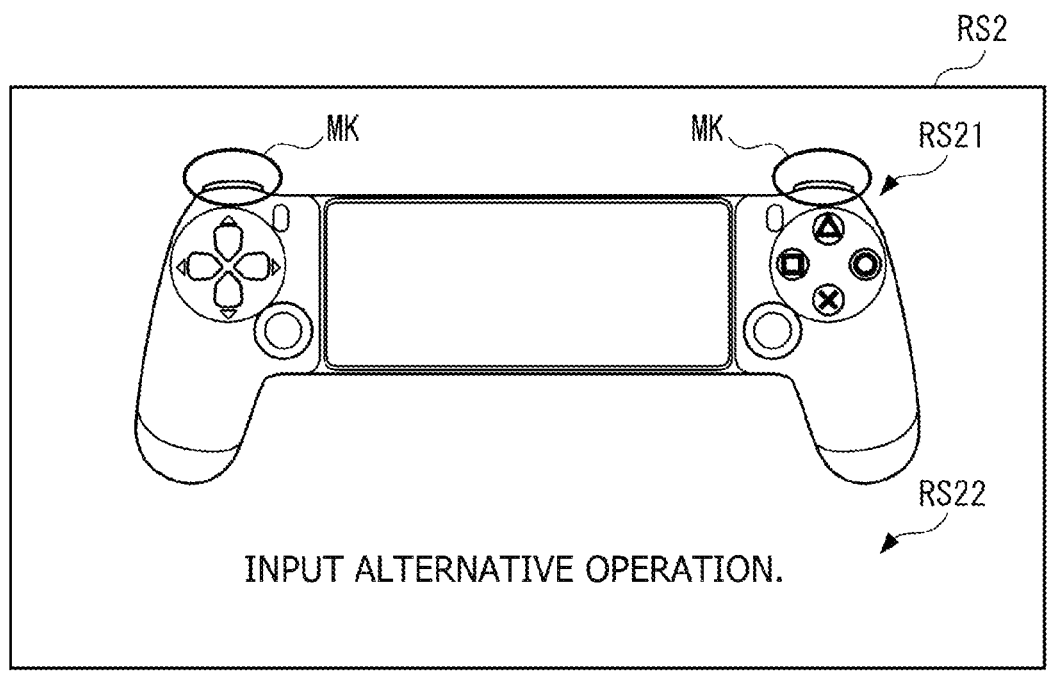
FIG. 8 is a schematic diagram depicting another exemplary operation registration screen according to the first embodiment.

FIG. 8 is a schematic diagram depicting another exemplary operation registration screen RS2. With at least one of the multiple operating elements 421 used as a target operating element, the target operating element may be selected upon display of the operation registration screen RS1. At this point, the display control section 61 causes the display section 52 to display the operation registration screen RS2. Note that the operation registration screen RS2 includes, as depicted in FIG. 8, for example, a display region RS21 displaying a pattern imitating the operation system 3A, and a message RS22 indicative of the content of the operation. In the example of the operation registration screen RS2 in FIG. 8, markers MK representing the target operating elements are set in the positions corresponding to the trigger buttons 425L and 425R in the pattern imitating the operation system 3A displayed in the display region RS21. That is, in the example of the operation registration screen RS2 in FIG. 8, the target operating elements are the trigger buttons 425L and 425R.

Upon display of the operation registration screen RS2, at least one of the multiple operating elements 421 may be operated. This causes the operation registration section 64 to register the performed operation as a target operation in association with the operated target operating element. That is, the operation registration section 64 registers the target operating element in association with the target operation. In other words, the operation registration section 64 causes the storage section 58 to store the target operating element and the target operation in association with each other. Incidentally, in a case where multiple operating elements 421 are selected as the target operating elements, the operation registration section 64 registers the target operating elements and the target operation in such a manner that when the multiple operating elements 421 selected as the target operating elements are operated simultaneously, the operation information corresponding to the target operation is transmitted. As a result, even in a case where the trigger buttons 425L and 425R are set as the target operating elements, for example, operating only one of the trigger buttons 425L and 425R will not transmit the operation information corresponding to the target operation.

[Configuration of Operation Determination Section]

The operation determination section 65 indicated in FIG. 5 determines, on the basis of the coordinates input from the touch panel 53, whether or not the operating position of the user on the touch panel 53 falls within the set range of the virtual button VB. Also, the operation determination section 65 determines whether or not the operating element 421 operated by the user is the target operating element based on the operation signal input from the multiple operating elements 421.

[Configuration of Information Generation Section]

The information generation section 66 generates the operation information corresponding to the operations performed on the operating elements 421 and on the touch panel 53. Specifically, in a case where the operation determination section 65 determines that the operating position on the touch panel 53 falls within the set region of the virtual button VB, the information generation section 66 generates the operation information corresponding to the function registered in association with the operated virtual button VB, for example, the operation information corresponding to the command registered in association with the operated virtual button VB. On the other hand, in a case where the operation determination section 65 determines that the operating position on the touch panel 53 does not fall within the set region of the virtual button VB, the information generation section 66 generates the operation information indicative of the coordinates of the operating position. Also in a case where the operation determination section 65 determines that the operated operating element 421 is the target operating element, the information generation section 66 generates the operation information corresponding to the command registered in association with the operated operating element. On the other hand, in a case where the operation determination section 65 determines that the operated operating element 421 is not the target operating element, the information generation section 66 generates the operation information corresponding to the operation signal input from the operated operating element 421, i.e., the operation information corresponding to the content of the operation of the operated operating element 421.

[Configuration of Information Transmission Section]

The information transmission section 67 transmits the operation information generated by the information generation section 66 to the information processing device 2 by use of the wireless communication part 572 in the communication section 57. This allows the information processing device 2 to perform predetermined processes or to advance the ongoing game in response to the received operation information. Note that, as needed, the information transmission section 67 transmits to the information processing device 2 the image captured by the imaging section 54 as well as the results of detection by the detection section 55.

[Virtual Button-Related Process]

Figure 9:
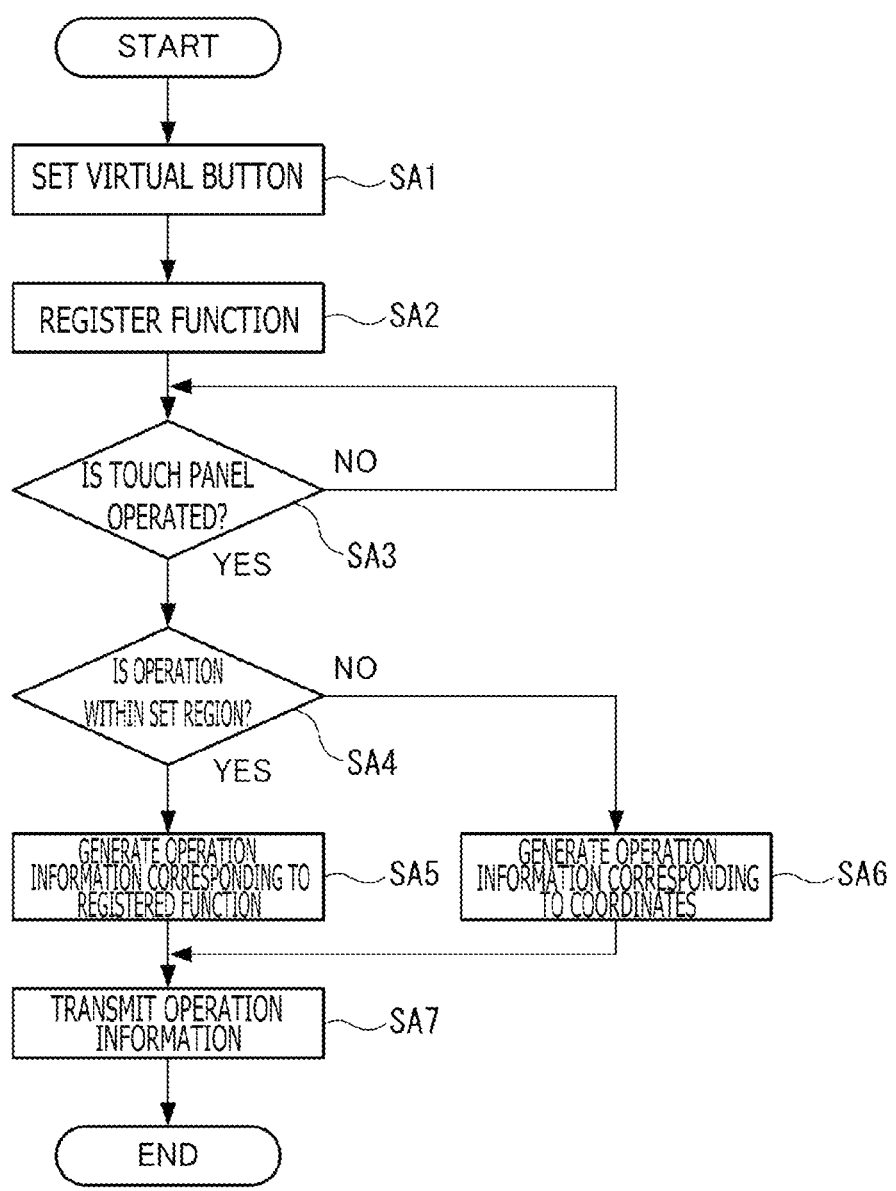
FIG. 9 is a flowchart depicting a virtual button-related process according to the first embodiment.

FIG. 9 is a flowchart depicting a virtual button-related process with respect to the virtual button VB. As described above, the information terminal 5 performs the virtual button-related process including a virtual button registration process and a transmission process, the virtual button registration process involving registering the virtual button VB to the touch panel 53, the transmission process involving transmitting the operation information corresponding to the function registered in association with the virtual button VB when the virtual button VB is operated. The virtual button-related process is a process that implements the operation information generation method of the present disclosure. This process is advanced by the control section 6 executing the operation application that includes an operation information generation program.

In the virtual button-related process, as depicted in FIG. 9, the button setting section 62 and the function registration section 63 first carry out the virtual button registration process. The virtual button registration process includes steps SA1 and SA2. In step SA1, on the basis of the operations performed by the user on the touch panel 53, the button setting section 62 sets on the touch panel 53 a region caused to function as the virtual button VB. In step SA2, the function registration section 63 registers, in association with the function set by the user, a coordinate range indicative of the region of the virtual button VB set by the button setting section 62. Incidentally, it is preferred that the virtual button registration process be carried out in advance before the start of the game.

During execution of the game following the virtual button registration process, the operation determination section 65, information generation section 66, and information transmission section 67 carry out the transmission process. In the virtual button-related process, the transmission process includes steps SA3 through SA7, to be discussed below. In the transmission process, the operation determination section 65 determines whether or not the touch panel 53 is operated by the user (step SA3). Specifically, the operation determination section 65 determines whether or not the coordinates of the operating position of the user are input from the touch panel 53. In a case where the operation determination section 65 determines that the coordinates of the operating position are not input, i.e., that the touch panel 53 is not operated (step SA3: NO), control is returned to step SA3. The operation determination section 65 then performs step SA3 periodically at a predetermined rate. On the other hand, in a case where the operation determination section 65 determines that the touch panel 53 is operated, i.e., that the coordinates of the operating position are input from the touch panel 53 (step SA3: YES), the operation determination section 65 determines whether or not the input coordinates fall within the set region of the virtual button VB (step SA4).

In the determination process of step SA4, in a case where the operation determination section 65 determines that the input coordinates fall within the set region of the virtual button VB (step SA4: YES), the information generation section 66 generates the operation information corresponding to the function registered in association with the operated virtual button VB (step SA5). In the determination process of step SA3, in a case where the operation determination section 65 determines that the input coordinates do not fall within the set region of the virtual button VB (step SA4: NO), the information generation section 66 generates the operation information indicative of the coordinates of the operating position (step SA6). After steps SA5 and SA6, the information transmission section 67 transmits the operation information generated by the information generation section 66 to the information processing device 2 (step SA7). The virtual button-related process above makes it possible to set, in a desired region on the touch panel 53, the virtual button VB to which a desired function can be registered. When the virtual button VB is operated, the operation information corresponding to the registered function can be transmitted to the information processing device 2.

[Assigned Operation-Related Process]

Figure 10:
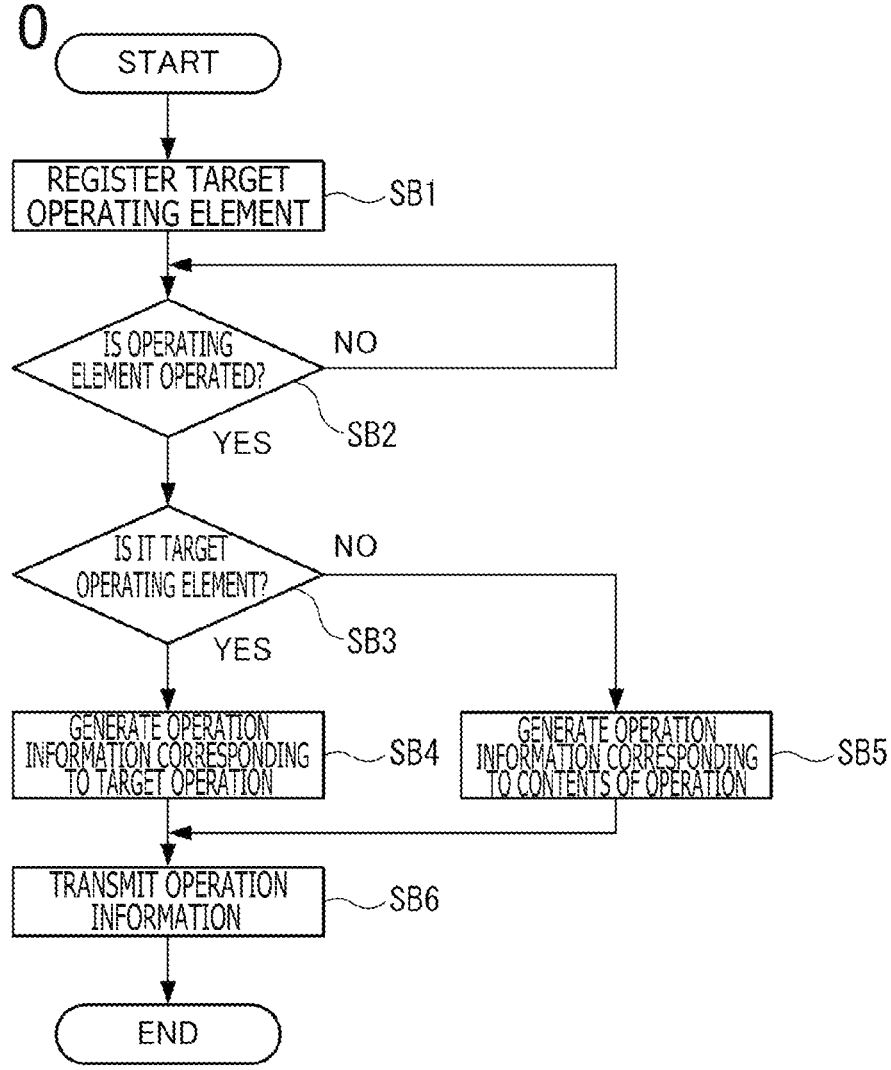
FIG. 10 is a flowchart depicting an assigned operation-related process according to the first embodiment.

FIG. 10 is a flowchart depicting the assigned operation-related process with respect to the target operating element. As discussed above, the information terminal 5 carries out the assigned operation-related process that includes the operation registration process in which the target operating element is registered and the transmission process in which the operation information corresponding to the command registered in association with the target operating element is transmitted. The assigned operation-related process is a process that implements the operation information generation method of the present disclosure. This process is advanced by the control section 6 executing the operation application that includes the operation information generation program. In the assigned operation-related process, as depicted in FIG. 10, the operation registration section 64 performs the operation registration process. The operation registration process includes step SB1. In step SB1, the operation registration section 64 takes at least one operating element 421 selected by the user from among the multiple operating elements 421 for the target operating element, and registers the target operating element and the command set by the user in association with each other (step SB1). Specifically, the operation registration section 64 stores the identification signal included in the operation signal output from the target operating element in association with the command set by the user.

During execution of the game following the operation registration process, the operation determination section 65, the information generation section 66, and the information transmission section 67 perform the transmission process. In the assigned operation-related process, the transmission process includes steps SB2 through SB6, to be described below. In the transmission process, the operation determination section 65 determines whether or not any operating element 421 is operated by the user (step SB2). That is, the operation determination section 65 determines whether or not the operation signal is input from any operating element 421. Incidentally, in a case where the operation determination section 65 determines that no operating element 421 is operated (step SB2: NO), control is returned to step SB2. The operation determination section 65 then performs step SB2 periodically at a predetermined rate. Next, in a case where the operation determination section 65 determines that any operating element 421 is operated (step SB2: YES), the operation determination section 65 determines whether or not the operated operating element 421 is the target operating element (step SB3). Specifically, in a case where the operation determination section 65 determines that the operation signal is input from any operating element 421, the operation determination section 65 determines whether or not the identification signal included in the input operation signal is an identification signal identifying the target operating element.

In the determination process of step SB3, in a case where the operation determination section 65 determines that the operated operating element 421 is the target operating element (step SB3: YES), the information generation section 66 generates the operation information corresponding to the target operation registered in association with the target operating element being operated (step SB4). In the determination process of step SB3, in a case where the operation determination section 65 determines that the operated operating element 421 is not the target operating element (step SB3: NO), the information generation section 66 generates the operation information corresponding to the content of the operation performed on the operating element 421, i.e., the operation information corresponding to the input operation signal (step SB5). After steps SB4 and SB5, the information transmission section 67 transmits the operation information generated by the information generation section 66 to the information processing device 2 (step SB6). The assigned operation-related process above makes it possible to take any of the multiple operating elements 421 desired by the user for the target operating element 421 and to assign the desired content of the operation to the target operating element. Thus, when the target operating element is operated, the command corresponding to the assigned content of the operation can be transmitted to the information processing device 2.

Effects of First Embodiment

The above-described information processing system 1A according to the first embodiment can provide the following effects. The operation system 3A includes the operation device 4 and the information terminal 5 connected to the operation device 4. The operation device 4 has the operation section 42 that includes multiple operating elements 421. The information terminal 5 includes the operation registration section 64, the operation determination section 65, the information generation section 66, and the information transmission section 67. The operation registration section 64 registers the operation involving the use of at least one of the multiple operating elements 421 to the target operating element constituted by at least one of the multiple operating elements 421. The operation determination section 65 determines whether or not the target operating element is operated. When the operation determination section 65 determines that the target operating element is operated, the information generation section 66 generates the operation information corresponding to the operation registered to the target operating element by the operation registration section 64. The information transmission section 67 transmits the operation information generated by the information generation section 66.

In the above-described configuration, the target operating element can be assigned the operation involving the use of at least one operating element 421. For this reason, operating the target operating element, for example, enables the information generation section 66 to generate either the operation information to be transmitted in a case where a complicated operation involving the use of at least one operating element is carried out or the operation information for executing a frequently used function, and allows the information transmission section 67 to transmit the generated operation information. That is, operating at least one operating element 421 makes it possible easily to transmit the operation information corresponding to the complicated operation or the operation information for executing a frequently used function. Accordingly, this can improve the versatility of the operation system 3A.

The operation system 3A has the operation device 4 and the information terminal 5 connected to the operation device 4. The operation device 4 has the operation section 42 that includes multiple operating elements 421. The information terminal 5 includes the touch panel 53, the button setting section 62, the function registration section 63, the information generation section 66, and the information transmission section 67. The button setting section 62 sets the virtual button VB to the touch panel 53. The function registration section 63 registers the virtual button VB in association with a predetermined function. When the virtual button VB is operated, the information generation section 66 generates the operation information corresponding to the function registered by the function registration section 63. The information transmission section 67 transmits the operation information generated by the information generation section 66.

In the above-described configuration, the virtual button VB can be set to the position desired by the user on the touch panel 53. This can enhance the operability of the operation system 3A. Also, because the function desired by the user can be registered to the virtual button VB to be set, operating the virtual button VB can easily transmit the operation information corresponding to a complicated operation or the operation information for executing a frequently used function. This can render the operation system 3A more versatile.

In the operation system 3A, the operation device 4 has the housing 41 to which he information terminal 5 is attached. The information terminal 5 has the detection section 55 that detects motion of the information terminal 5. The information transmission section 67 transmits the results of detection by the detection section 55. This configuration makes it possible, even in a case where the operation device 4 has no detection section, to transmit the motion of the information terminal 5 detected by the detection section 55 included in the information terminal 5 formed integrally with the operation device and, by extension, to transmit the motion of the operation system 3A. This can further enhance the versatility of the operation system 3A.

The information processing system 1A includes the operation system 3A and the information processing device 2 that operates on the basis of the operation information received from the operation system 3A. The information terminal 5 includes the display section 52, the communication section 57 that communicates with the information processing device 2, and the display control section 61 that causes the display section 52 to display the image received by the communication section 57 from the information processing device 2. This configuration can provide effects similar to those offered by the operation system 3A. Further, the display section 52 as part of the information terminal 5 can display an image received from the information processing device 2, such as the sub-screen. This can also improve the versatility of the information processing system 1A.

The assigned operation-related process is carried out by the information terminal 5 connected to the operation device 4 that has multiple operating elements 421. The assigned operation-related process includes step SB1 corresponding to an operation registration procedure and an operation registration step, steps SB2 and SB3 corresponding to an operation determination procedure and an operation determination step, and step SB4 corresponding to an information generation procedure and an information generation step. In step SB1, the operation involving the use of at least one of the multiple operating elements 421 is registered to the target operating element constituted by at least one of the multiple operating elements 421. In steps SB2 and SB3, it is determined whether or not the target operating element is operated. If the target operating element is determined to be operated, step SB4 is carried out. In step SB4, the operation information corresponding to the operation registered to the target operating element is generated. The content of steps SB1 through SB4 corresponds to the operation information generation method and to the operation information generation program. The above-described operation system 3A is configured by combining the information terminal 5 executing the assigned operation-related process above with the operation device 4.

The virtual button-related process is carried out by the information terminal 5 connected to the operation device 4 having multiple operating elements 421. The virtual button-related process includes step SA1 corresponding to a button setting procedure and a button setting step, step SA2 corresponding to a function registration procedure and a function registration step, and step SA5 corresponding to an information generation procedure and an information generation step. In step SA1, the virtual button VB is set to the touch panel 53 constituting part of the information terminal 5. In step SA2, the virtual button VB is registered in association with a predetermined function. In step SA5, the operation information corresponding to the function registered in step SA2 is generated when the virtual button VB is determined to be operated in steps SA3 and SA4. The above-described operation system 3A can be configured by combining the information terminal 5 executing the virtual button-related process above with the operation device 4.

Variations of First Embodiment

In the operation system 3A according to the first embodiment, the information terminal 5 formed integrally with the operation device 4 transmits the operation information to the information processing device 2. Alternatively, the operation device 4 may have an information transmission section similar to the information transmission section 67. The operation information generated by the information generation section 66 may then be transmitted to the information processing device 2 by the information transmission section of the operation device 4. The button setting section 62, the function registration section 63, the operation registration section 64, the operation determination section 65, and the information generation section 66 may alternatively be included in the operation device 4. In this case, under control of the display control section 61, the display section 52 may display the screen for registering the virtual button VB as well as screens such as the operation registration screens RS1 and RS2. As another alternative, these screens may be displayed on the display device DP.

Second Embodiment

A second embodiment of the present disclosure is described below. An information processing system according to the second embodiment is configured similarly to the information processing system 1A according to the first embodiment, except that the operation system is configured differently. Incidentally, in the ensuing description, like reference signs designate constituent elements that are identical or substantially similar to those discussed above, and their redundant explanations are omitted.

Figure 11:
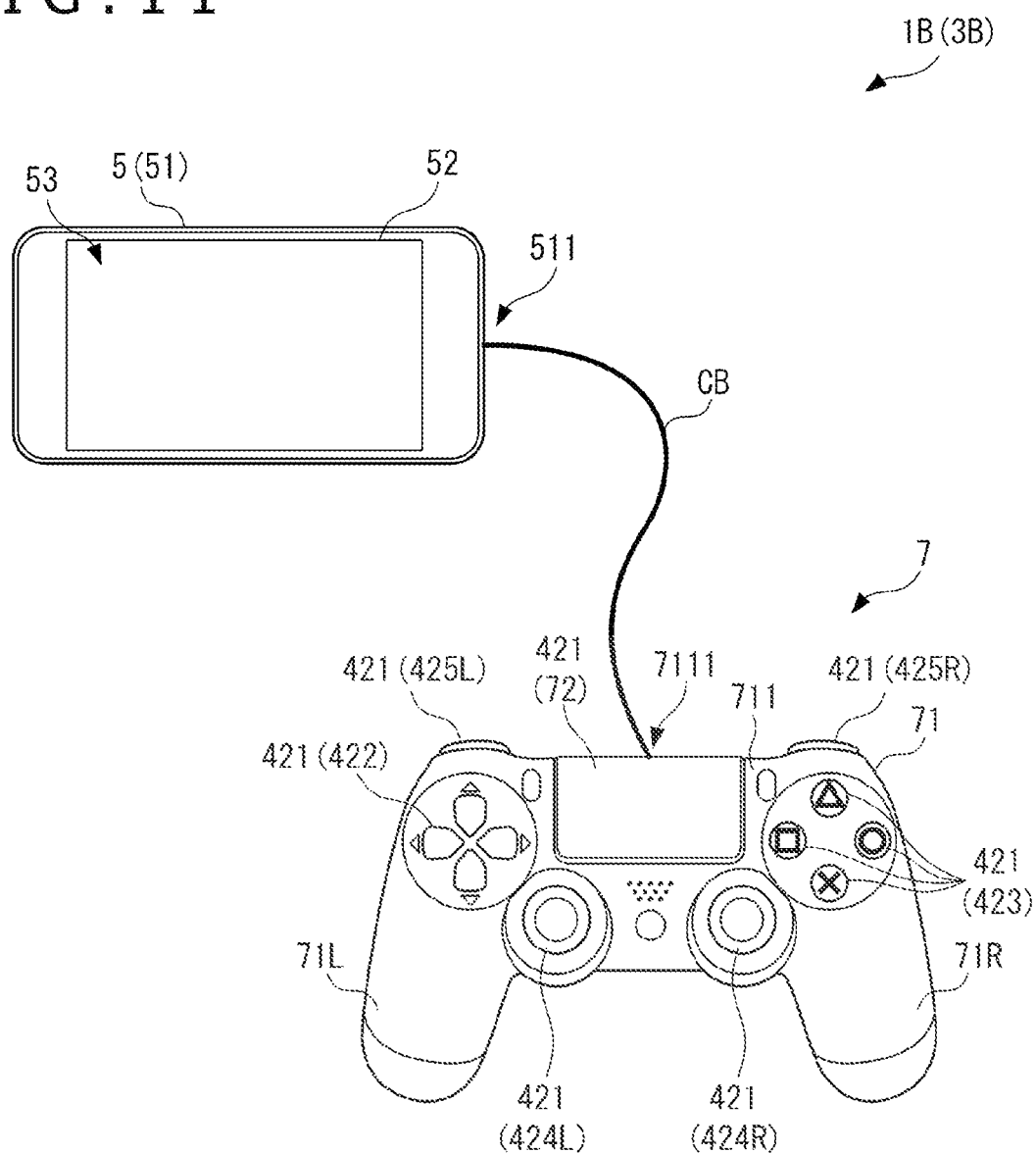
FIG. 11 is a schematic diagram depicting an operation system for an information processing system according to a second embodiment of the present disclosure.

FIG. 11 is a schematic diagram depicting an operation system 3B included in an information processing system 1B according to the second embodiment. The information processing system 1B according to the second embodiment includes the information processing device 2 and the operation system 3B indicated in FIG. 10. In the information processing system 1B, the operation system 3B transmits the operation information corresponding to the operation performed by the user. The information processing device 2 performs processes corresponding to the operation information received from the operation system 3B. The configuration of the operation system 3B is explained below.

[Configuration of Operation System]

The operation system 3B functions in a manner similar to the operation system 3A according to the first embodiment. The operation system 3B includes an operation device 7 and an information terminal 5 operating in coordination with each other. Note that the configuration of the information terminal 5 is as described above and thus will not be discussed further.

[Configuration of Operation Device]

As with the operation device 4, the operation device 7 is connected with the information terminal 5. The operation device 7 outputs to the information terminal 5 an operation signal that includes an identification signal corresponding to the operating element 421 operated by the user and an operation signal including the content of the operation performed on the operating element 421. The operation device 7 can communicate independently with the information processing device 2, i.e., the operation device 7 can transmit the operation signal to the information processing device 2 without the intervention of the information terminal 5. The operation device 7 includes a housing 71 and an operation section 42 that includes multiple operating elements 421.

The housing 71 constitutes a sheathing of the operation device 7. The housing 71 includes a central part 711, a left-side grip 71L positioned on the left of the central part 711, and a right-side grip 71R located on the right of the central part 711. On the upper side of the central part 711, provided is a terminal part 7111 connected to one end of a cable of which the other end is coupled with the information terminal 5. At the front face of the central part 711 is a touch panel 72. The touch panel 72 is one of the operating elements 421 of the second embodiment. As with the touch panel 53, the touch panel 72 detects the position of the operation performed thereon by the user, and outputs an operation signal that includes an identification signal identifying the touch panel 72 and a content signal indicative of the coordinates of the operating position thus detected.

The left-side grip 71L is a part of the housing 71 to be held by the left hand of the user. The left-side grip 71L is shaped to be similar to the left-side grip 41L. Of the multiple operating elements 421 constituting the operation section 42, arrow buttons 422, an analog controller 424L, and a trigger button 425L are disposed on the left-side grip 71L. The right-side grip 71R is a part of the housing 71 to be held by the right hand of the user. The right-side grip 71R is shaped to be similar to the right-side grip 41R. Of the multiple operating elements 421 constituting the operation section 42, four buttons 423, an analog controller 424R, and a trigger button 425R are disposed on the right-side grip 71R. As described above, any of the multiple operating elements 421 operated by the user outputs the operation signal that includes the identification signal identifying the operated operating element 421 and the content signal indicative of the content of the operation performed on the operating element 421.

Figure 12:
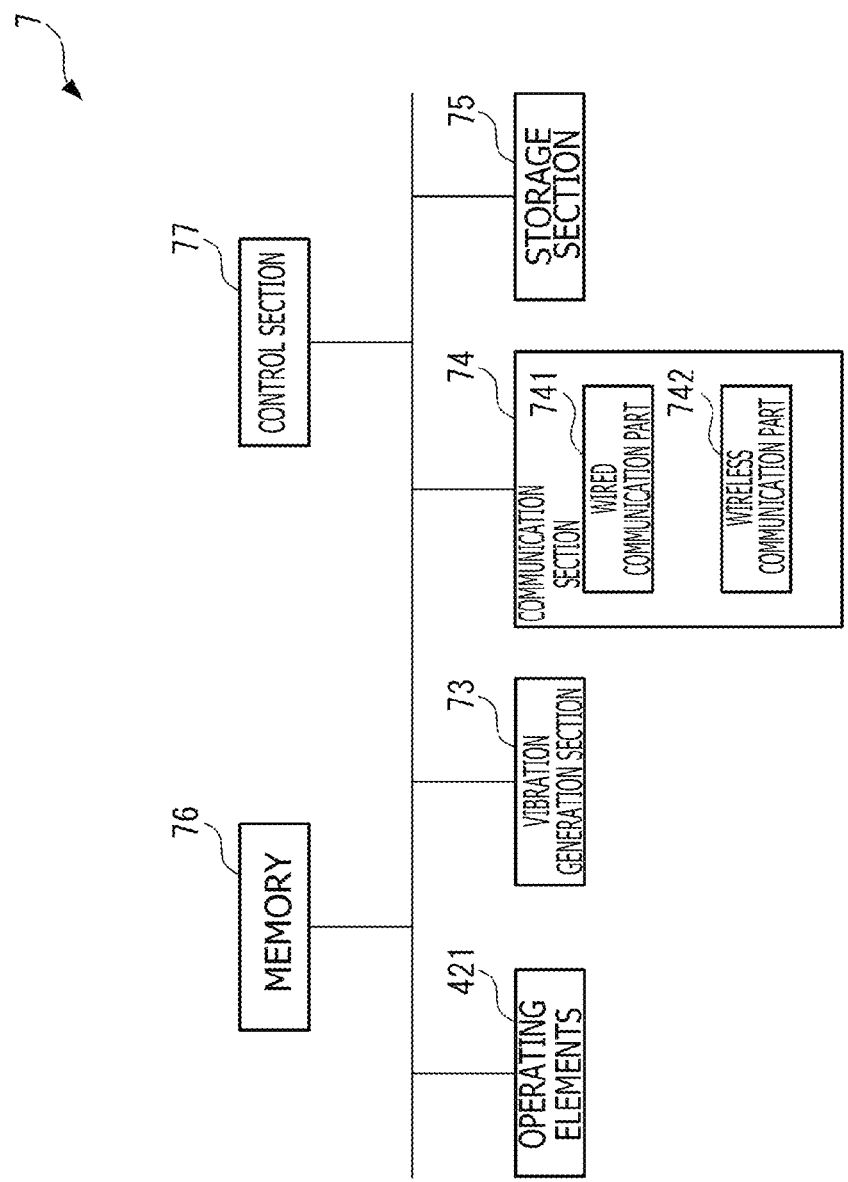
FIG. 12 is a block diagram depicting a configuration of an operation device according to the second embodiment.

FIG. 12 is a block diagram depicting a configuration of the operation device 7.

As depicted in FIG. 12, the operation device 7 includes a vibration generation section 73, a communication section 74, a storage section 75, a memory 76, and a control section 77 in addition to the above-described constituent elements. The vibration generation section 73 generates vibration under control of the control section 77. As with the vibration generation section 56, the vibration generation section 73 has an oscillator such as a motor.

Under control of the control section 77, the communication section 74 communicates with external equipment. As with the communication section 57, the communication section 74 includes a wired communication part 741 and a wireless communication part 742. The wired communication part 741 communicates with the external equipment connected via the terminal part 7111. For example, the wired communication part 741 outputs the operation signal input from the operating element 421 to the information terminal 5 via a cable CB connected to the terminal part 7111. The wireless communication part 742 communicates wirelessly with the external equipment. Note that, in a case where the operation device 7 communicates with the information terminal 5 in a wired manner, the communication by the wireless communication part 742 with the information terminal 5 is subject to restrictions. That is, when the operation device 7 communicates with the information terminal 5, the wired communication part 741 overrides the wireless communication part 742. Also, the communication by the wireless communication part 572 of the information terminal 5 with the information processing device 2 overrides the communication by the wireless communication part 742 with the information processing device 2.

The storage section 75 stores the programs and data necessary for the operation device 7 to operate. For example, the storage section 75 stores the information regarding the connection with communicable external equipment. The memory 76 is a work memory for the control section 77. The control section 77 controls the operation of the operation device 7. For example, on the basis of a vibration generation signal received from the external equipment via the communication section 74, the control section 77 causes the vibration generation section 73 to generate vibration. Also, in a case where the control section 77 is connected with the information terminal 5 via the cable CB, the control section 77 outputs the operation signal input from the operating elements 421 to the information terminal 5 by way of the cable CB.

[Effects of Information Terminal]

As described above, the information terminal 5 transmits to the information processing device 2 the operation information corresponding to the operations performed by the user on the operation device 7 and on the information terminal 5. Besides carrying out the virtual button-related process, the information terminal 5 performs the assigned operation-related process based on the operation signal input from the operation device 7. This allows the information terminal 5 to transmit to the information processing device 2 the operation information corresponding to the operation on the operation device 7 as well as the operation information corresponding to the function and command set by the user.

[Effects of Second Embodiment]

The above-described information processing system 1B according to the second embodiment can provide effects similar to those of the information processing system 1A according to the first embodiment, and can also offer the following effects. In the operation system 3B, the operation device 7 and the information terminal 5 are connected communicably to each other via the cable CB. In this configuration in which the terminal part 7111 of the operation device 7 is connected with the terminal part 511 of the information terminal 5 via the cable CB, the operation device 7 and the information terminal 5 are connected communicably to each other. As a result, the operation system 3B can be configured simply.

Variations of Second Embodiment

In the operation system 3B constituting the above-described information processing system 1B, the information terminal 5 operating in conjunction with the operation device 7 transmits the operation information to the information processing device 2. Alternatively, the operation device 7 may include an information transmission section for transmitting the operation information. That is, the operation device 7 may communicate with the information processing device 2 by way of the wireless communication part 742 of the operation device 7, the wireless communication part 742 acquiring the operation information generated by the information generation section 66 and transmitting the acquired operation information to the information processing device 2. Also, the button setting section 62, the function registration section 63, the operation registration section 64, the operation determination section 65, and the information generation section 66 may be included in the operation device 7. In this case as well, the setting screens such as the operation registration screens RS1 and RS2 may be displayed either by the display section 52 of the information terminal 5 or by the display device DP by way of the information processing device 2.

Other Variations of Embodiments

It is to be understood that the present disclosure is not limited to the above-described embodiments and that variations, modifications, and the like made within the scope of achieving the object of the present disclosure are also included therein. In the above-described embodiments, the operation device 4 or 7 communicates with the information terminal 5 in a wired manner, while the information terminal 5 communicates with the information processing device 2 wirelessly. However, this is not limitative, and the operation device 4 or 7 may communicate wirelessly with the information terminal 5, with the information terminal 5 communicating with the information processing device 2 in a wired manner. Also, in a case where the operation device includes an information transmission section for transmitting the operation information, the operation device and the information processing device 2 may communicate with each other either in a wired manner or wirelessly. Incidentally, in a case where the operation device 4 or 7 or the information terminal 5 in the operation system 3A or 3B transmits the operation information wirelessly, the operations performed by the user on the operation system 3A or 3B are not subject to constraints by the cable connecting the information processing device 2 with the operation system 3A or 3B. This can make it easier for the user to operate the operation system 3A or 3B.

In the operation system 3A or 3B of each of the above-described embodiments, the information terminal 5 carries out both the virtual button-related process and the assigned operation-related process. However, this is not limitative, and the information terminal 5 may perform either the virtual button-related process or the assigned operation-related process only.

In the above-described embodiments, the operation device 4 or 7 has the operation section 42 that includes multiple operating elements 421. The multiple operating elements 421 include the arrow buttons 422, four buttons 423, two analog controllers 424L and 424R, and two trigger buttons 425L and 425R. However, this is not limitative, and at least one of the buttons 422, 423, 425L and 425R may be omitted, and at least one of the analog controllers 424L and 424R may also be omitted. Further, the multiple operating elements 421 may include other operating elements that add to, or replace at least one of, the buttons 422, 423, 425L, 425R, and analog controllers 424L and 424R. That is, the operating elements to be disposed on the operation device of the present disclosure are not limited to those discussed above.

In the first embodiment, the information terminal 5 is attached to the housing 41 in a manner being integral with the operation device 4. In this setup, the information terminal 5 may be oriented either horizontally or vertically. Also, the information terminal 5 may be formed integrally with the operation device 4 at the back of the latter. In the second embodiment, the information terminal 5 is connected to the operation device 7 via the cable CB. Alternatively, the information terminal 5 and the operation device 7 connected communicably to each other via the cable CB may be formed integrally with each other.

In the above-described embodiments, the display section 52 of the information terminal 5 can display the image received from the information processing device 2. However, this is not limitative, and the information processing device 2 need not transmit an image to the information terminal 5. The information terminal 5, for its part, need not display the image sent from the information processing device 2. In the above-described embodiments, the information terminal 5 having the imaging section 54 and the detection section 55 transmits to the information processing device 2 the image captured by the imaging section 54 and the results of detection by the detection section 55. However, this is not limitative, and at least either the imaging section 54 or the detection section 55 may be omitted. Also, it is not mandatory to have the vibration generation section 56 configured.

In the above-described embodiments, the operation applications including the operation information generation program are stored in the storage section 58 or 75. However, this is not limitative, and when at least either the virtual button-related process or the assigned operation-related process is carried out, for example, the control section 6 or 77 may read and execute the operation information generation program from recording media on which the operation information generation program is recorded. Typical example recording media include disk-type recording media, semiconductor memories, and the like. Further, the control section 6 or 77 may acquire the operation information generation program from a device on a network. In the above-described embodiments, the information processing device 2 is a game machine capable of executing game programs. However, this is not limitative, and the information processing device 2 may also execute processes other than the games.

[Summary of Present Disclosure]

The present disclosure is summarized below. According to the first embodiment of the present disclosure, there is provided an operation system including an operation device, and an information terminal connected to the operation device, in which the operation device has an operation section including a plurality of operating elements, in which the information terminal includes an operation registration section configured to register an operation involving use of at least one of the plurality of operating elements to a target operating element constituted by at least one of the plurality of operating elements, an operation determination section configured to determine whether or not the target operating element is operated, and an information generation section configured to generate, when the target operating element is determined to be operated, operation information corresponding to the operation registered to the target operating element by the operation registration section, and either the operation device or the information terminal includes an information transmission section configured to transmit the operation information generated by the information generation section.

In the above-described configuration, the target operating element can be assigned the operation involving the use of at least one operating element. For this reason, operating the target operating element, for example, enables the information generation section to generate the operation information for transmission when a complicated operation involving the use of at least one operating element is carried out or to generate the operation information for executing a frequently used function, and allows the information transmission section to transmit the generated operation information. That is, operating at least one operating element makes it possible easily to transmit the operation information corresponding to a complicated operation, or the operation information for executing a frequently used function. Thus, this can improve the versatility of the operation system.

According to the second embodiment of the present disclosure, there is provided an operation system including an operation device, and an information terminal connected to the operation device, in which the operation device has an operation section including a plurality of operating elements, the information terminal includes a touch panel, a button setting section configured to set a virtual button to the touch panel, a function registration section configured to register the virtual button in association with a predetermined function, and an information generation section configured to generate, when the virtual button is operated, operation information corresponding to the function registered by the function registration section, and either the operation device or the information terminal includes an information transmission section configured to transmit the operation information generated by the information generation section.

In the above-described configuration, the virtual button can be set to the position desired by the user on the touch panel. This can enhance the operability of the operation system. Also, because the function desired by the user can be registered to the virtual button being set, operating the virtual button can easily transmit the operation information representing a complicated operation or the operation information for executing a frequently used function, as in the case of the above-described operation system. This renders the operation system more versatile.

In the first and the second embodiments, the operation device may have a housing to which the information terminal is attached. The information terminal may have a detection section configured to detect motion of the information terminal. The information transmission section may transmit a result of detection by the detection section. In this configuration, even in a case where the operation device has no detection section, it is possible to transmit the motion of the information terminal and, by extension, the motion of the operation system detected by the detection section included in the information terminal formed integrally with the operation device. Thus, this can improve the versatility of the operation system.

In the first and the second embodiments, the operation device and the information terminal may be connected communicably with each other via a cable. In this configuration, in a case where the operation device and the information terminal are each furnished with the terminal part connectable with the cable, the operation device and the information terminal can be connected communicably with each other. Thus, this makes it possible simply to configure the operation system.

According to the third embodiment of the present disclosure, there is provided an information processing system including the above-described operation system and an information processing device configured to operate on the basis of the operation information received from the operation system. The information terminal includes a display section, a communication section configured to communicate with the information processing device, and a display control section configured to cause the display section to display an image received by the communication section from the information processing device. In this configuration, the information processing system can provide effects similar to those of the operation system according to the first or the second embodiment. Further, the display section included in the information terminal can display image received from the information processing device. This enhances the versatility of the information processing system.

According to the fourth embodiment of the present disclosure, there is provided an operation information generation method for execution by an information terminal connected to an operation device having a plurality of operating elements. The operation information generation method includes an operation registration procedure of registering an operation involving use of at least one of the plurality of operating elements to a target operating element constituted by at least one of the plurality of operating elements, an operation determination procedure of determining whether or not the target operating element is operated, and an information generation procedure of generating, when the target operating element is determined to be operated, operation information corresponding to the operation registered to the target operating element. The information terminal executing the above operation information generation method is combined with the operation device, thereby making it possible to constitute an operation system similar to that of the first embodiment.

According to the fifth embodiment of the present disclosure, there is provided an operation information generation method for execution by an information terminal connected to an operation device having a plurality of operating elements. The operation information generation method includes a button setting procedure of setting a virtual button to a touch panel included in the information terminal, a function registration procedure of registering the virtual button in association with a predetermined function, and an information generation procedure of generating, when the virtual button is operated, operation information corresponding to the function registered by the function registration procedure. The information terminal executing the above operation information generation method is combined with the operation device, thereby making it possible to constitute an operation system similar to that of the second embodiment.

According to the sixth embodiment of the present disclosure, there is provided an operation information generation program for execution by an information terminal connected to an operation device having a plurality of operating elements. The operation information generation program causes the information terminal to execute an operation registration step of registering an operation involving use of at least one of the plurality of operating elements to a target operating element constituted by at least one of the plurality of operating elements, an operation determination step of determining whether or not the target operating element is operated, and an information generation step of generating, when the target operating element is determined to be operated, operation information corresponding to the operation registered to the target operating element. The information terminal executing the above operation information generation program is combined with the operation device, thereby making it possible to constitute an operation system similar to that of the first embodiment.

According to the seventh embodiment of the present disclosure, there is provided an operation information generation program for execution by an information terminal connected to an operation device having a plurality of operating elements, the operation information generation program causing the information terminal to execute a button setting step of setting a virtual button to a touch panel included in the information terminal, a function registration step of registering the virtual button in association with a predetermined function, and an information generation step of generating, when the virtual button is operated, operation information corresponding to the function registered by the function registration step. The information terminal executing the above operation information generation program is combined with the operation device, thereby making it possible to constitute an operation system similar to that of the second embodiment.

REFERENCE SIGNS LIST 1A, 1B: Information processing system
2: Information processing device
3A, 3B: Operation system
4, 7: Operation device
41: Housing
42: Operation section
421: Operating elements
5: Information terminal
52: Display section
53: Touch panel
55: Detection section
57: Communication section
61: Display control section
62: Button setting section
63: Function registration section
64: Operation registration section
65: Operation determination section
66: Information generation section
67: Information transmission section
CB: Cable
VB: Virtual button

The invention claimed is:

1. An operation system comprising:
an operation device; and
an information terminal connected to the operation device,
wherein the operation device has an operation section including a plurality of operating elements,
the information terminal is configured to:
execute an operation registration process to register a command to a target operating element of the plurality of operating elements, wherein execution of the operation registration process comprises:
storing the target operating element and the command for the target operating element in association with each other; and
storing an identification signal included in an operation signal output from the target operating element in association with the command;
determine whether or not the target operating element is operated;
generate, when the target operating element is determined to be operated, the operation signal corresponding to the command registered to the target operating element; and
wherein either the operation device or the information terminal includes an information transmission section configured to transmit the operation signal.

2. The operation system according to claim 1, wherein the operation device has a housing to which the information terminal is attached, and wherein the information terminal includes:
a detection section configured to detect motion of the information terminal, and
the information transmission section transmits a result of detection by the detection section.

3. The operation system according to claim 1, wherein the operation device and the information terminal are connected communicably with each other via a cable.

4. An operation system comprising:
an operation device; and
an information terminal connected to the operation device,
wherein the operation device has an operation section including a plurality of operating elements, the information terminal includes:
a touch panel,
the information terminal is configured to:
> set a virtual button to the touch panel, by receiving, via the touch panel, a first selection of the touch panel, the first selection defining a coordinate range indicative of a region associated with a virtual button;
> register the virtual button in association with a predetermined function by receiving a second selection of the touch panel and determining that the second selection of the touch panel is within the coordinate range indicative of the region associated with the virtual button; and
> generate, when the virtual button is operated, operation information corresponding to the predetermined function, and wherein either the operation device or the information terminal is configured to transmit the operation information.

5. An information processing system comprising:
an operation device;
an information terminal connected to the operation device,
wherein the operation device has an operation section including a plurality of operating elements,
the information terminal is configured to:
> execute an operation registration process to register a command to a target operating element of the plurality of operating elements, wherein execution of the operation registration process comprises:
>> storing the target operating element and the command for the target operating element in association with each other; and
>> storing an identification signal included in an operation signal output from the target operating element in association with the command;
>
> determine whether or not the target operating element is operated;
> generate, when the target operating element is determined to be operated, the operation signal corresponding to the operation registered to the target operating element; and wherein either the operation device or the information terminal includes an information transmission section configured to transmit the operation signal; and
an information processing device configured to operate on a basis of the operation signal received from the information transmission section,
wherein the information terminal includes:
> a display section,
> a communication section configured to communicate with the information processing device, and
> a display control section configured to cause the display section to display an image received by the communication section from the information processing device.

6. An operation information generation method for execution by an information terminal connected to an operation device having a plurality of operating elements, the operation information generation method comprising:
> registering a command to a target operating element of the plurality of operating elements, wherein registering the operation comprises:
>> storing the target operating element and the command for the target operating element in association with each other; and
>> storing an identification signal included in an operation signal output from the target operating element in association with the command;
>
> determining whether or not the target operating element is operated; and
> generating, when the target operating element is determined to be operated, the operation signal corresponding to the command registered to the target operating element.

7. An operation information generation method for execution by an information terminal connected to an operation device having a plurality of operating elements, the operation information generation method comprising:
> receiving, via a touch panel included in the information terminal, a first selection of the touch panel, the first selection defining a coordinate range indicative of a region associated with a virtual button;
> setting, responsive to the first selection, a virtual button to the coordinate range indicative of the region of the touch panel included in the information terminal;
> registering the virtual button in association with a predetermined function by receiving a second selection of the touch panel and determining that the second selection of the touch panel is within the coordinate range indicative of the region associated with the virtual button; and
> generating, when the virtual button is operated, operation information corresponding to the predetermined function.

8. A non-transitory, computer readable storage medium containing a computer program, which when executed by an information terminal connected to an operation device having a plurality of operating elements, causes the information terminal to carry out actions, comprising:
> registering a command to a target operating element of the plurality of operating elements, wherein registering the operation comprises:
>> storing the target operating element and the command for the target operating element in association with each other; and
>> storing an identification signal included in an operation signal output from the target operating element in association with the command;
>
> determining whether or not the target operating element is operated; and
> generating, when the target operating element is determined to be operated, the operation signal corresponding to the command registered to the target operating element.

9. A non-transitory, computer readable storage medium containing a computer program, which when executed by an information terminal connected to an operation device having a plurality of operating elements, causes the information terminal to carry out actions, comprising:
> receiving, via a touch panel included in the information terminal, a first selection of the touch panel, the first selection defining a coordinate range indicative of a region associated with a virtual button;
> setting, responsive to the first selection, a virtual button to the coordinate range indicative of the region of the touch panel included in the information terminal;
> registering the virtual button in association with a predetermined function by receiving a second selection of the touch panel and determining that the second selection of the touch panel is within the coordinate range indicative of the region associated with the virtual button; and generating, when the virtual button is operated, operation information corresponding to the predetermined function.

\* \* \* \* \*